July 4, 1950 — A. J. KLINE — 2,513,494
COWTAIL HOLDER
Filed Aug. 16, 1946
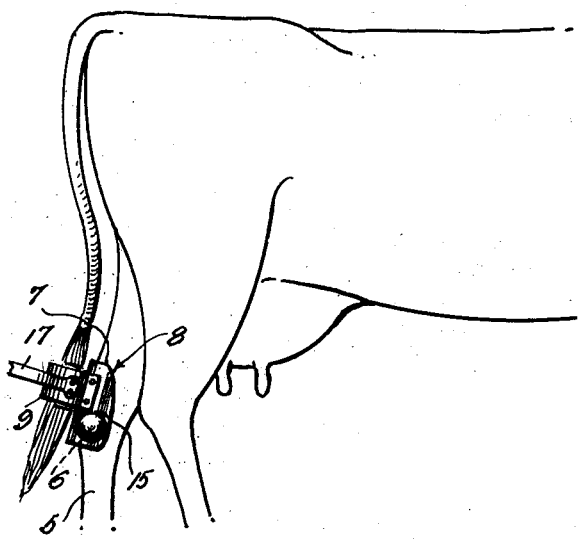
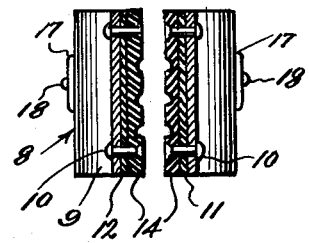
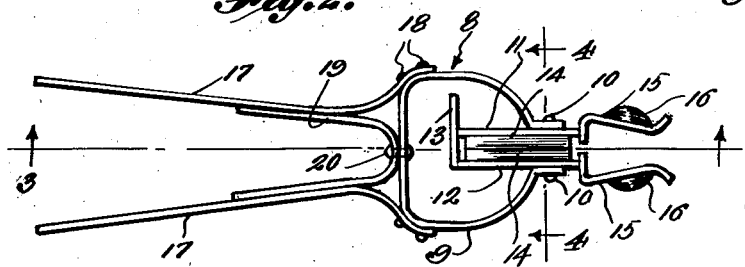
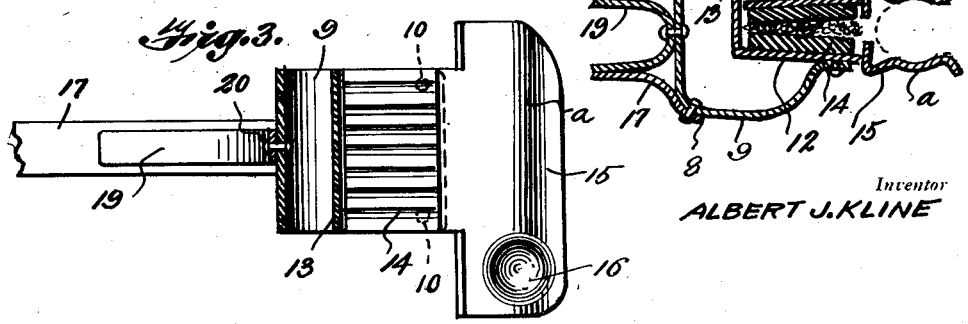
Inventor
ALBERT J. KLINE
By Randolph & Beavers
Attorneys Patented July 4, 1950

2,513,494

UNITED STATES PATENT OFFICE 2,513,494

COW TAIL HOLDER

Albert J. Kline, New Douglas, Ill.

Application August 16, 1946, Serial No. 691,056

2 Claims. (Cl. 119—105)

This invention relates to cow tail holders intended to hold the tail of a cow, especially during milking operation.

An important object of the present invention is to provide a cow leg attachable device for holding cow tails still, the device being so constructed as to be humane yet positive acting and substantially fool-proof at all times.

Still another object of the invention is to provide a cow tail holder which can be readily adjusted to position without possibility of inflicting any injury on the cow and without setting up any uncomfortable condition that might tend to upset the composure of the cow during milking operations.

These and other objects and advantages of the invention will become apparent to the reader of the following description.

In the drawing:

Figure 1 is a fragmentary side elevational view of the rear part of a cow showing the tail holder in use.

Figure 2 is a top plan view of the holder.

Figure 3 is a sectional view taken substantially on line 3—3 of Figure 2.

Figure 4 is a transverse section taken on line 4—4 of Figure 2.

Figure 5 is a fragmentary sectional view through the jaws and main spring of the device.

Referring to the drawing, numeral 5 denotes one leg of a cow having the usual knee bone 6 and the upper leg leader 7. It is intended that the holder generally referred to by numeral 8 be situated on the cow's leg so as to not only embrace the knee bone but also a substantial portion of the upper leg leader 7.

The holder includes a substantially cylindrical split main spring 9, the end portions of which are riveted as at 10 to a pair of opposed jaw plates 11, 12, the plate 12 having a laterally disposed back plate 13 overlapping the inner end of the jaw plate 11, so as to prevent the cow's tail from entering the confines of the main spring 9.

Pads or blocks 14 of cushion or resilient material are secured to the opposed faces of the jaw plates 11, 12 and the same rivets 10 may serve to secure these blocks in position.

Leg gripping jaws 15, 15 are secured in any suitable manner to the outer edges of the jaw plates 11, 12 and as shown in Figure 5, these jaws are longitudinally corrugated as at a to conform with the configuration of the upper leg leader 7, while the lower portion of each leg jaw 15 is cupped outwardly as at 16 to fit over the corresponding side portion of the cow's knee 6.

For actuating the holder, a pair of handles 17, 17 are riveted or otherwise secured to the back portion of the main spring 9, as at 18, at points suitably spaced apart and when the handles 17, 17 are pressed toward each other, the ends of the main spring 9 will be flexed apart to space the jaw plates 11, 12 and the cushion blocks 14 apart to receive a cow's tail (preferably the hairy terminal portion of the tail).

A booster spring 19 of substantially U-shape, has its bight portion riveted or otherwise secured, as at 20 to the back portion of the main spring 9, while its leg portions bear against the inner sides of the handles 17, 17, thus spreading the handles apart and assisting the main spring 9 in maintaining the jaw plates 11, 12 closed.

As is shown in Figure 3, it is preferable that the leg engaging jaws 15, 15 be substantially longer than the width of the spring 9 so as to secure its efficient purchase on the leg of the cow.

In the use of the holder, the handles 17, 17 are first contracted, in order to open the jaw plates 11, 12 and the jaws 15. The hairy part of the cow's tail is now inserted between the cushion blocks 14, 14 and the jaws 15, 15 disposed in straddling position over the lower part of the upper leg, as shown in Figure 1, first making certain that the cups 16 are centered over the opposite sides of the knee. The holder can now be swung inwardly so that the jaws 15, 15 are embracing the leader 7 of the upper leg and with the parts in this position, the handles 17 can be released, whereupon the jaws 15, 15 will snugly, yet comfortably engage the leg, while the hairy portion of the tail will be held between the clamp blocks 14.

Thus, the cow's tail is held by one leg of the cow, through the use of this device, without discomfort to the cow, because there is but slight pressure on the cow's leg and practically no noticeable effect on the tail, because the tail is being held by the hairy terminal portion.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. A cow tail holder comprising a main spring having a rear cross bar and arms extending forwardly from ends thereof, the arms being bent toward each other and terminating in forwardly extending lips, plates mounted against inner faces of the lips and having portions extending rearwardly into space between the arms of the spring, said plates constituting jaws for gripping a cow's tail and one having a side flange at its rear and extending across the rear end of the other plate and constituting a guard for preventing rearward movement of the cow's tail beyond the plates, leg gripping jaws at front end of said plates projecting forwardly therefrom and having upper and lower portions projecting beyond upper and lower ends of the plates, handles carried by said main spring at ends of the cross bar thereof and projecting rearwardly from the main spring, and a U-shaped booster spring disposed between the handles longitudinally thereof and having its bridge portion secured against the rear face of the cross bar of the main spring and its arms extending rearwardly therefrom along inner faces of the handles.

2. A cow tail holder comprising a main spring having a cross bar and arms extending forwardly therefrom and toward each other, plates carried by forward ends of the arms and having portions extending rearwardly into space between the arms, one plate having a side extension at its rear end extending across the rear end of the other plate, said plates constituting jaws for gripping a cow's tail between them, leg gripping jaws mounted at front ends of the plates and projecting forwardly therefrom, and handles carried by the spring at the junction of its cross bar and arms extending rearwardly from the spring.

ALBERT J. KLINE.

REFERENCES CITED

The following references are of record in the file of this patent:

UNITED STATES PATENTS

| Number | Name | Date |
| --- | --- | --- |
| 390,176 | Lee | Sept. 25, 1888 |
| 518,580 | Bartholomew | Apr. 24, 1894 |
| 539,916 | Hilliker | May 28, 1895 |
| 718,273 | McLellan | Jan. 13, 1903 |
| 1,141,746 | Zenke | June 1, 1915 |
| 1,866,029 | Grabowski | July 5, 1932 |
| 2,156,413 | Van der Meulen | May 2, 1939 |

FOREIGN PATENTS

| Number | Country | Date |
| --- | --- | --- |
| 110,570 | Australia | May 23, 1940 |